(12) United States Patent
Uchida et al.

(10) Patent No.: US 11,123,817 B2
(45) Date of Patent: Sep. 21, 2021

(54) METHOD OF WELDING LAMINATED METAL FOILS

(71) Applicant: TOYOTA JIDOSHA KABUSHIKI KAISHA, Toyota (JP)

(72) Inventors: Keisuke Uchida, Nagoya (JP); Hiroomi Kobayashi, Okazaki (JP); Nozomi Tateyama, Okazaki (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 538 days.

(21) Appl. No.: 15/982,080

(22) Filed: May 17, 2018

(65) Prior Publication Data
US 2018/0361504 A1    Dec. 20, 2018

(30) Foreign Application Priority Data
Jun. 20, 2017  (JP) .............................. JP2017-120724

(51) Int. Cl.
*B23K 26/21* (2014.01)
*B23K 101/36* (2006.01)

(52) U.S. Cl.
CPC .......... *B23K 26/21* (2015.10); *B23K 2101/36* (2018.08)

(58) Field of Classification Search
CPC ...... B23K 26/21; B23K 26/323; B23K 33/00; B23K 26/211; B23K 26/03; B23K 26/32; B23K 26/22; B23K 26/70; B23K 26/00; B23K 26/06; B23K 26/20; B23K 26/30; B23K 26/08; B23K 26/244; B23K 26/322; B23K 26/36; H02K 15/00; G01N 21/55; B29C 64/393; H01L 29/10; H01L 21/26; H01L 21/36; G02B 26/08; C30B 21/02

USPC ......................................................... 219/121
See application file for complete search history.

(56) References Cited

U.S. PATENT DOCUMENTS

2015/0283648 A1* 10/2015 Hisada ................ B23K 26/082
                                                              403/272
2016/0136755 A1*  5/2016 Kobayashi ........... B23K 26/032
                                                              219/121.64

FOREIGN PATENT DOCUMENTS

| JP | S63130290 | A | * | 6/1988 | |
| JP | 2007-222937 | A |   | 9/2007 | |
| JP | 2007222937 | A | * | 9/2007 | |
| JP | 2015-217422 | A |   | 12/2015 | |
| JP | 2016030280 | A | * | 3/2016 | |
| WO | WO-2012146965 | A1 | * | 11/2012 | ............ B23K 26/22 |

* cited by examiner

*Primary Examiner* — Robert J Utama
*Assistant Examiner* — Rachel R Rizzo
(74) *Attorney, Agent, or Firm* — Sughrue Mion, PLLC (57) ABSTRACT

A method of welding laminated metal foils (LMF) by projecting a laser beam onto LMF sandwiched between an upper metal plate and a lower metal plate from a side of the upper metal plate and laser-welding the LMF to the upper metal plate and the lower metal plate. The method includes: forming a hole in an upper surface of the upper metal plate and forming a chamfered part so that a diameter of the hole expands toward the upper surface before the laser welding; and in the laser welding, projecting the laser beam for heat conduction welding onto the chamfered part of the upper metal plate to form a molten pool; and projecting the laser beam in a circle to agitate the molten pool and grow the molten pool in a laminating direction of the LMF so that the molten pool reaches the lower metal plate.

3 Claims, 8 Drawing Sheets

METHOD OF WELDING LAMINATED METAL FOILS

CROSS REFERENCE TO RELATED APPLICATIONS

This application is based upon and claims the benefit of priority from Japanese patent application No. 2017-120724, filed on Jun. 20, 2017, the disclosure of which is incorporated herein in its entirety by reference.

BACKGROUND

The present disclosure relates to a method of welding laminated metal foils, and more particularly to a method of welding laminated metal foils sandwiched between a pair of metal plates.

For example, secondary batteries and capacitors collect current by laminated metal foils for electrodes bonded to a metal plate for current collection. Normally, laminated metal foils and a metal plate made of aluminum or copper having excellent conductivity are bonded by welding (metallurgical bonding) or mechanical bonding. When welding is used in this case, electrical resistance after the bonding can be reduced as compared with mechanical bonding.

Japanese Unexamined Patent Application Publication No. 2015-217422 discloses a method of welding laminated metal foils sandwiched between a pair of metal plates. Specifically, a molten pool is formed on a surface of the metal plate by performing heat conduction welding using a first laser beam, and then second and third laser beams are projected onto the molten pool to perform keyhole welding. The molten pool formed by heat conduction welding can more effectively prevent welding defects such as blowholes from being formed during keyhole welding.

SUMMARY

The inventors have found the following problem relating to the method of welding laminated metal foils.

That is, the method of welding laminated metal foils disclosed in Japanese Unexamined Patent Application Publication No. 2015-217422 still has a problem in that blowholes are formed during welding, and spatter occurs when the blowholes burst, because keyhole welding is performed. The blowholes may remain in a welded part and adversely affect the fatigue strength, contact resistance, etc. of the welded part, and the spatter may adhere to and be mixed in the welded part as a foreign object to cause an adverse effect.

It is well known that heat conduction welding can more effectively prevent blowholes and spatter from being formed as compared with the case where keyhole welding is used. However, as described in Japanese Unexamined Patent Application Publication No. 2015-217422, a molten pool penetrating the metal plate irradiated with a laser beam cannot be formed only by simply performing heat conduction welding. That is, the molten pool necessary for bonding the pair of metal plates to the laminated metal foils cannot be grown. For example, when the pair of metal plates and the laminated metal foils are made of a metal material having high thermal conductivity such as aluminum, copper, or an alloy containing them as a main component, the heat of the molten pool tends to escape, which is especially a problem.

The present disclosure has been made in view of such circumstances. An object of the present disclosure is to provide a method of welding laminated metal foils that can grow a molten pool necessary for bonding a pair of metal plates to the laminated metal foils while more effectively preventing blowholes and spatter from being formed by heat conduction welding.

An example aspect of the present disclosure is a method of welding laminated metal foils by projecting a laser beam onto laminated metal foils sandwiched between an upper metal plate and a lower metal plate from a side of the upper metal plate and laser-welding the laminated metal foils to the upper metal plate and the lower metal plate. The method includes:

forming a hole in an upper surface of the upper metal plate and forming a chamfered part so that a diameter of the hole expands toward the upper surface before the laser welding; and in the laser welding,
   projecting the laser beam for heat conduction welding onto the chamfered part of the upper metal plate to form a molten pool; and
   projecting the laser beam in a circle to agitate the molten pool and grow the molten pool in a laminating direction of the laminated metal foils so that the molten pool reaches the lower metal plate.

In the method of welding laminated metal foils according to the example aspect of the present disclosure, the chamfered part of the hole formed in the upper metal plate is irradiated with the laser beam for the heat conduction welding to form the molten pool. The thin chamfered part facilitates forming of the molten pool while more effectively preventing blowholes and spatter from being formed by heat conduction welding. Then, the laser beam for the heat conduction welding is projected in a circle to agitate the molten pool and grow the molten pool in a laminating direction of the laminated metal foils so that the molten pool reaches the lower metal plate. That is, it is possible to grow the molten pool necessary for bonding a pair of metal plates to the laminated metal foils while more effectively preventing blowholes and spatter from being formed by heat conduction welding.

The hole may be a through-hole.

Such a configuration facilitates forming of the hole.

In the laser welding, feedback control may be performed on an irradiation condition of the laser beam based on intensity of thermal radiation light emitted from the molten pool.

Such a configuration improves the quality of the welded part.

The laminated metal foils, the upper metal plate, and the lower metal plate may be made of a metal material containing aluminum or copper as a main component. The present disclosure is preferable for such a configuration.

According to the present disclosure, it is possible to provide a method of welding laminated metal foils that can grow a molten pool necessary for bonding a pair of metal plates to the laminated metal foils while more effectively preventing blowholes and spatter from being formed by heat conduction welding.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Hereinafter, specific embodiments to which the present disclosure is applied will be described in detail with reference to the drawings. However, the present disclosure is not limited to the following embodiments. In order to clarify the descriptions, the following descriptions and drawings are simplified as appropriate.

First Embodiment

<Structure of Welded Laminated Metal Foils>

First, laminated metal foils welded by a method of welding laminated metal foils according to a first embodiment will be described with reference to FIGS. 1 and 2.

Figure 1:
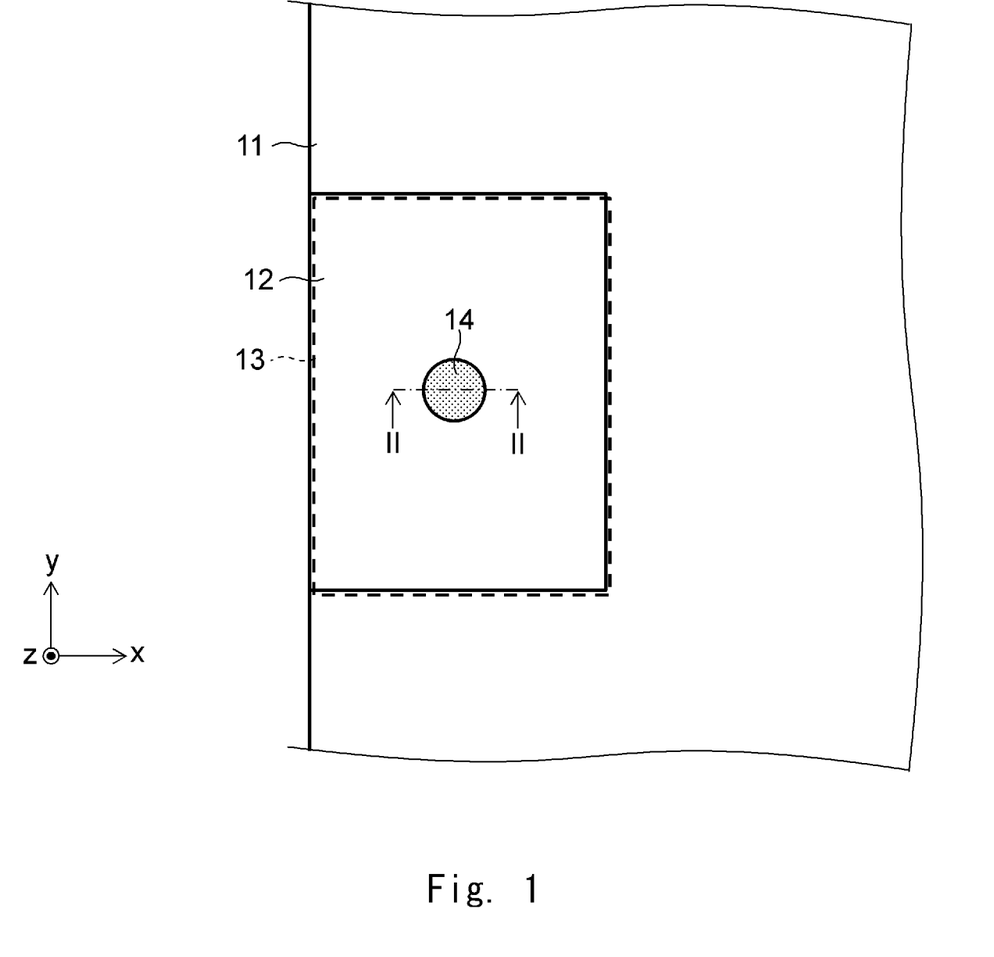
FIG. 1 is a plan view of laminated metal foils welded by a method of welding laminated metal foils according to a first embodiment.

FIG. 1 is a plan view of laminated metal foils welded by the method of welding laminated metal foils according to the first embodiment. FIG. 2 is a cross-sectional view taken along the line II-II of FIG. 1. As shown in FIGS. 1 and 2, laminated metal foils 11 are sandwiched between an upper metal plate 12 and a lower metal plate 13 and welded to the upper metal plate 12 and the lower metal plate 13 at a welded part 14.

It is obvious that right-handed xyz orthogonal coordinates shown in FIG. 1 and other drawings are merely for convenience of describing the positional relationship of the components. Normally, a z-axis positive direction is vertically upward and a xy plane is a horizontal plane, which are common to the drawings. In FIG. 1, the upper metal plate 12 and the lower metal plate 13 actually overlap each other, although they are drawn offset from each other for easier understanding.

The laminated metal foils 11 are formed by laminating metal foils extending from an electrode (a positive electrode or negative electrode) in, for example, a secondary battery, a capacitor, etc. The laminated metal foils 11 are formed by laminating about 30 to 100 metal foils each having a thickness of, for example, about 10 to 30 μm. The laminated metal foils 11 are preferably made of a metal material having high conductivity such as aluminum, copper, or an alloy containing them as a main component.

As shown in FIG. 1, a part of a periphery of the laminated metal foils 11 is sandwiched between the pair of the upper metal plate 12 and the lower metal plate 13 for current collection. In other words, the laminated metal foils 11 are bundled by the upper metal plate 12 and the lower metal plate 13. Each of the upper metal plate 12 and the lower metal plate 13 has a rectangular shape in a xy plane view, and has a thickness of, for example, about 1 to 1.5 mm. In terms of weldability and electrical resistance of the welded part 14, the upper metal plate 12 and the lower metal plate 13 are preferably made of the same kind of a metal material as that of the laminated metal foils 11. Specifically, when the laminated metal foils 11 are made of aluminum, the upper metal plate 12 and the lower metal plate 13 are also preferably made of aluminum. When the laminated metal foils 11 are made of copper, the upper metal plate 12 and the lower metal plate 13 are also preferably made of copper.

Figure 2:
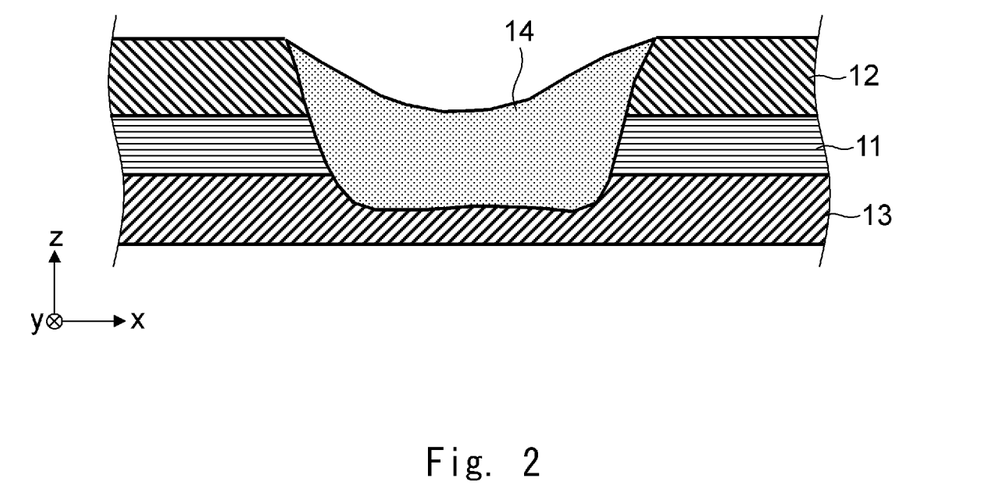
FIG. 2 is a cross-sectional view taken along the line II-II of FIG. 1.

As shown in FIG. 2, at the welded part 14, all the metal foils constituting the laminated metal foils 11 are welded to each other, and the laminated metal foils 11 are welded to the upper metal plate 12 and the lower metal plate 13. In the example of FIG. 2, the welded part 14 is formed from an upper surface of the upper metal plate 12 (a surface of the upper metal plate 12 on the z axis positive direction side) to inside of the lower metal plate 13 through the laminated metal foils 11. That is, although it is shown in the example of FIG. 2 that the welded part 14 does not penetrate through the rear surface, it may in actuality penetrate through the rear surface.

As will be described later in detail, in the laminated metal foils 11 welded by the method of welding laminated metal foils according to the first embodiment, the welded part 14 is formed by projecting a laser beam for heat conduction welding in a circle. As the heat conduction welding is used, forming of blowholes and spatter can be more effectively prevented as compared with the case where keyhole welding is used.

When the laser beam is projected in a circle, the molten pool is agitated and grows in the laminating direction of the laminated metal foils 11 while it is being swung, so that the upper metal plate 12, the lower metal plate 13, and the laminated metal foils 11 can be bonded. This facilitates discharge of blowholes, thereby more effectively preventing blowholes from being formed.

In this manner, in the laminated metal foils 11 welded by the method of welding laminated metal foils according to the first embodiment, blowholes are more effectively prevented from being formed at the welded part 14.

<Method of Welding Laminated Metal Foil>

Figure 3:
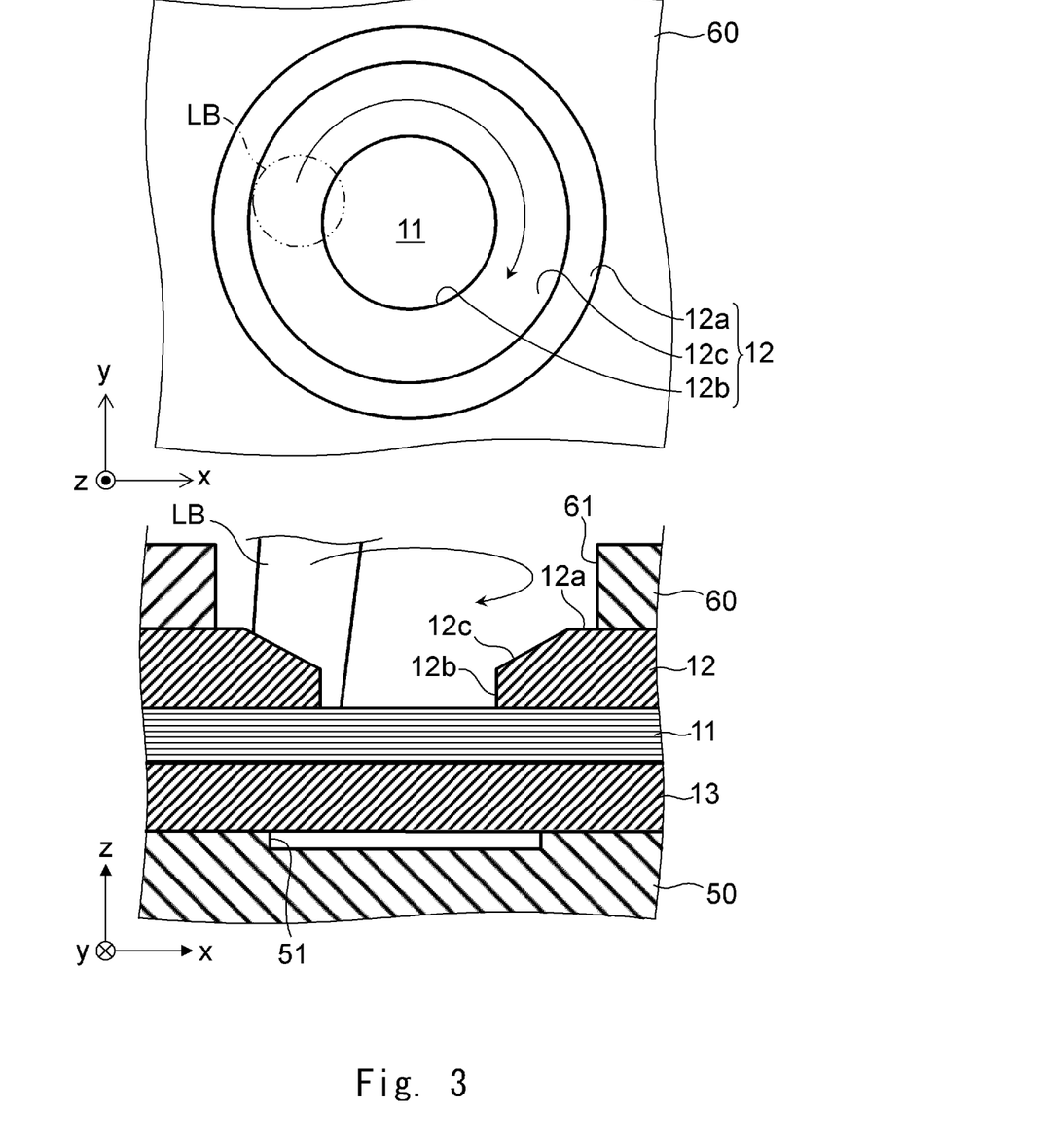
FIG. 3 is a plan view and a cross-sectional view showing the method of welding laminated metal foils according to the first embodiment.
Figure 4:
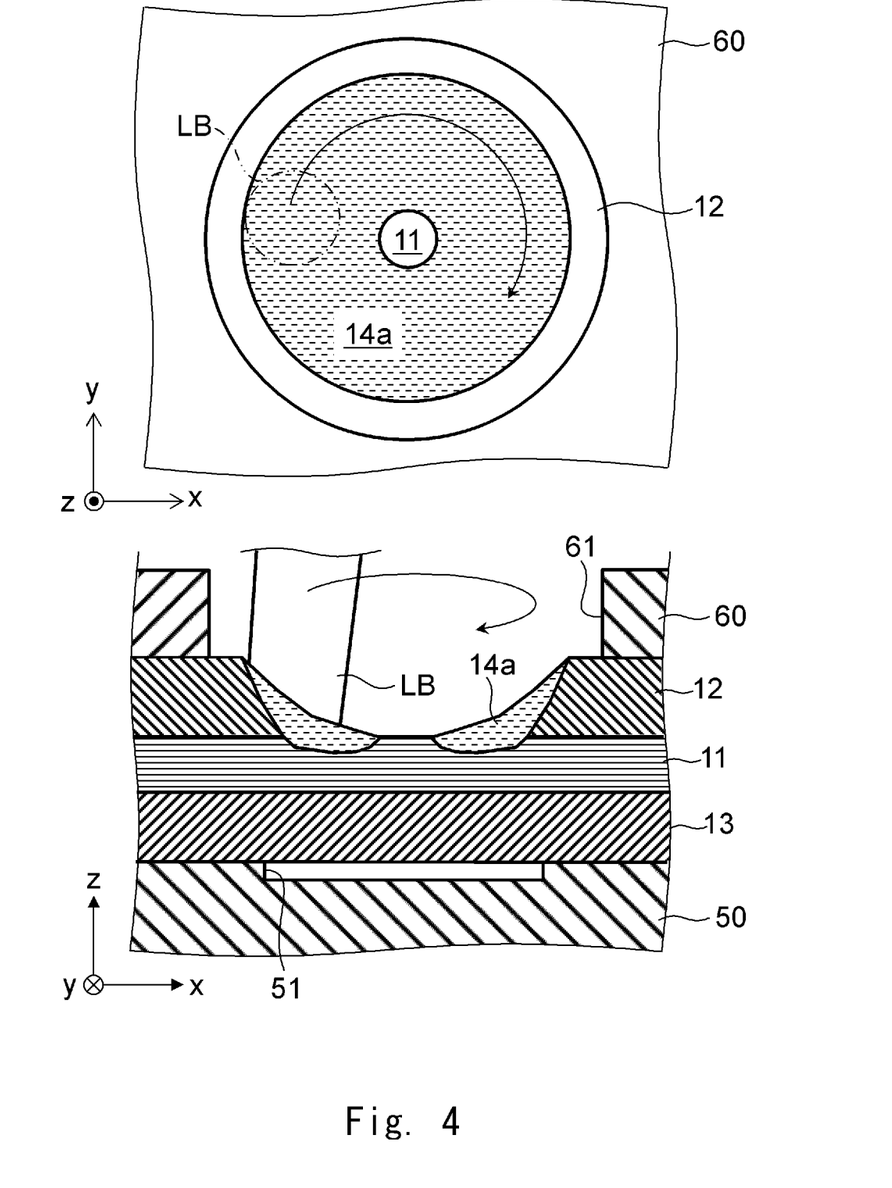
FIG. 4 is a plan view and a cross-sectional view showing the method of welding laminated metal foils according to the first embodiment.
Figure 5:
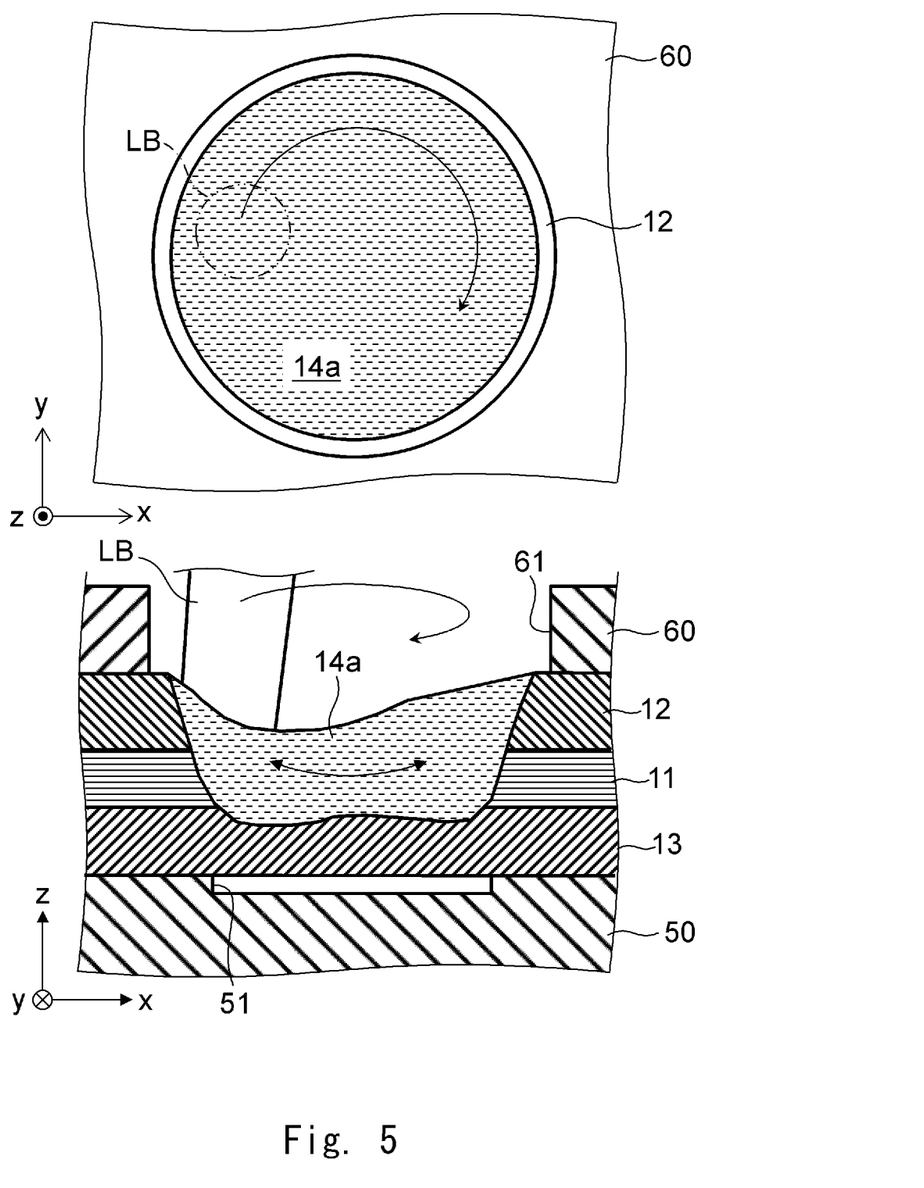
FIG. 5 is a plan view and a cross-sectional view showing the method of welding laminated metal foils according to the first embodiment.

Next, the method of welding laminated metal foils according to this embodiment will be described with reference to FIGS. 3 to 5. FIGS. 3 to 5 are a plan view and a cross-sectional view showing the method of welding laminated metal foils according to the first embodiment. In each of FIGS. 3 to 5, an upper drawing is a plan view, and a lower drawing is a cross-sectional view.

Firstly, as shown in FIG. 3, the upper metal plate 12 is positioned on the upper side (the z-axis positive direction side), the lower metal plate 13 is positioned on the lower side (the z-axis negative direction side), and then the laminated metal foils 11 are placed on an upper surface of a base 50 (a surface of the base 50 on the z axis positive direction side). For example, a hole 12b having a circular shape in an xy plane view is formed at a welding point of an upper surface 12a of the upper metal plate 12. Further, an annular chamfered part 12c in the xy plane view is formed in such a way that the hole 12b expands toward the upper surface 12a. That is, the hole 12b and the chamfered part 12c are formed in the welding point of the upper surface 12a of the upper metal plate 12 prior to the laser welding. The hole 12b shown in FIG. 3 is a through hole, but it may instead be a blind hole.

However, a through hole is preferable because it is easier to process. The chamfered part 12c can be formed by, for example, machining.

On the other hand, the periphery of the chamfered part 12c of the upper metal plate 12 irradiated with a laser beam LB is pressed from above by a pressing jig 60. Thus, the pressing jig 60 has a through hole 61 that is a size larger than the chamfered part 12c of the upper metal plate 12. In this way, the laminated metal foils 11 are sandwiched between the lower metal plate 13 placed on the base 50 and the upper metal plate 12 pressed by the pressing jig 60. Then, as shown in FIG. 3, the laser beam LB for the heat conduction welding is projected in a circle along the chamfered part 12c of the upper metal plate 12. The laser beam for heat conduction welding is a laser beam having an energy density that does not cause keyholes to be formed. The energy density of the laser beam LB can be adjusted by changing the laser output or a spot diameter.

Next, as shown in FIG. 4, by continuing to project the laser beam LB in a circle along the same trajectory, the chamfered part 12c of the upper metal plate 12 is melted to form a molten pool 14a. In the chamfered part 12c, a thickness of the upper metal plate 12 is reduced in a direction toward the hole 12b. Thus, the molten pool 14a can easily penetrate the upper metal plate 12 even with the laser beam LB for heat conduction welding.

Note that the laser beam LB does not necessarily have to be projected in a circle along the same trajectory as long as it is projected onto the chamfered part 12c.

Further, the molten pool 14a formed in the chamfered part 12c is immediately brought into contact with the laminated metal foils 11 through the hole 12b, and the laminated metal foils 11 melt due to heat conduction. When the laser beam LB is directly projected onto the laminated metal foils 11 through the hole 12b, the temperature of the metal foil on the surface sharply rises and spatter tends to occur. In the method of welding laminated metal foils according to this embodiment, the laminated metal foils 11 are melted by heat conduction from the molten pool 14a that has melted the chamfered part 12c of the upper metal plate 12 instead of by directly projecting the laser beam LB onto the laminated metal foils 11. This more effectively prevents spatter form being formed.

Finally, as shown in FIG. 5, the molten pool 14a is agitated by continuing to project the laser beam LB in a circle along the same trajectory. The agitation makes the molten pool 14a swing and grow in the laminating direction of the laminated metal foils 11, and the molten pool 14a reaches the lower metal plate 13. As a result, the upper metal plate 12 and the lower metal plate 13 can be bonded to the laminated metal foils 11. As the discharge of blowholes is facilitated when the molten pool 14a grows while it is being swung, blowholes can be more effectively prevented from being formed. A recess 51 depressed in a disk shape is formed in the upper surface of the base 50 that is brought into contact with the lower surface of the lower metal plate 13 so that the molten pool 14a will not be immediately brought into contact at the time of the penetration of the molten pool 14a.

After that, when the projection of the laser beam LB is completed, the molten pool 14a solidifies, and the welded part 14 shown in FIGS. 1 and 2 is formed.

Note that the laser beam LB does not necessarily have to be projected in a circle along the same trajectory as long as it is projected onto the molten pool 14a.

In the method of welding laminated metal foils according to the first embodiment, the laser beam LB for heat conduction welding is projected onto the chamfered part 12c of the hole 12b of the upper metal plate 12 to thereby form the molten pool 14a. The thin chamfered part 12c facilitates forming of the molten pool 14a while more effectively preventing blowholes and spatter from being formed by heat conduction welding. In addition, the molten pool 14a is immediately brought into contact with the laminated metal foils 11 through the hole 12b, and the laminated metal foils 11 can be melted by heat conduction. That is, the laminated metal foils 11 are melted by heat conduction from the molten pool 14a without directly irradiating the laminated metal foils 11 with the laser beam LB. This more effectively prevents spatter from being formed.

The projection of the laser beam LB for heat conduction welding in a circle makes the molten pool 14a become agitated, and grow in the laminating direction of the laminated metal foils 11 while swinging it so that it reaches the lower metal plate 13. Consequently, the upper metal plate 12 and the lower metal plate 13 can be bonded to the laminated metal foils 11 while more effectively preventing blowholes and spatter from being formed. The swinging of the molten pool 14a facilitates discharge of blowholes, and thus blowholes are more effectively prevented from being formed.

As described above, in the method of welding laminated metal foils according to the first embodiment, the molten pool 14a necessary for bonding the pair of metal plates to the laminated metal foils can be grown while more effectively preventing blowholes and spatter from being formed by heat conduction welding.

<Configuration of Laser Welding Apparatus>

Figure 6:
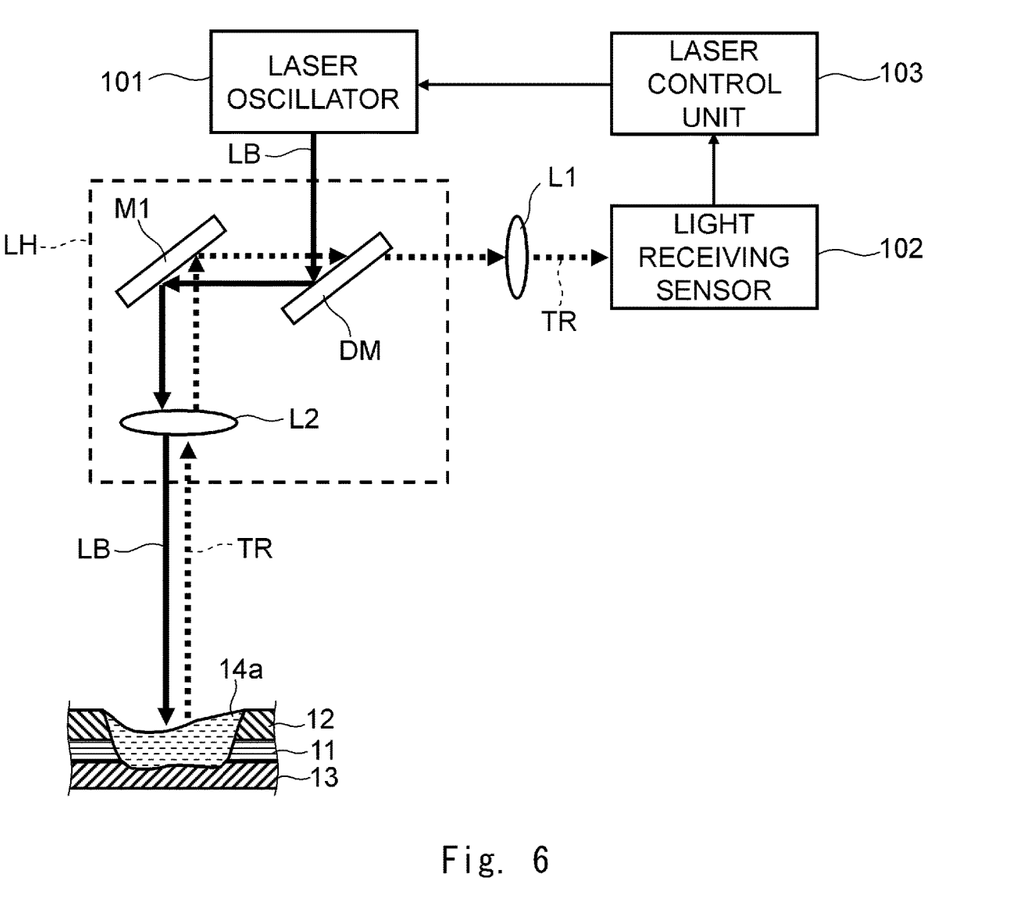
FIG. 6 is a block diagram showing a configuration of a laser welding apparatus used for the method of welding laminated metal foils according to the first embodiment.

Next, a laser welding apparatus used for the method of welding laminated metal foils according to the first embodiment will be described with reference to FIG. 6. FIG. 6 is a block diagram showing a configuration of a laser welding apparatus used for the method of welding laminated metal foils according to the first embodiment. As shown in FIG. 6, the laser welding apparatus used for the method of laser-welding laminated metal foils according to the first embodiment includes a laser oscillator 101, a laser head LH, a lens L1, a light receiving sensor 102, and a laser control unit 103.

The laser oscillator 101 oscillates the laser beam LB with a laser output based on a control signal output from the laser control unit 103. For example, when a total thickness of the laminated metal foils 11 is about 0.6 to 1.0 mm and the thickness of the upper metal plate 12 and the lower metal plate 13 is about 1.0 to 1.5 mm, the laser output is about 1000 to 3000 W. The laser beam LB output from the laser oscillator 101 is input to the laser head LH.

The laser head LH is, for example, a Galvano scanning laser head capable of scanning. As shown in FIG. 6, the laser head LH includes a dichroic mirror DM, a mirror M1, and a lens L2. The dichroic mirror DM reflects the laser beam LB and transmits thermal radiation light. The laser beam LB is reflected by the dichroic mirror DM and the mirror M1, collected by the lens L2, and then radiated from the laser head LH. The laser beam LB radiated from the laser head LH is projected onto a point to be welded in the laminated metal foils 11 and the upper metal plate 12 and the lower metal plate 13 to form the molten pool 14a. As an example, when the total thickness of the laminated metal foils 11 is about 0.6 to 1.0 mm and the thickness of the upper metal plate 12 and the lower metal plate 13 is about 1.0 to 1.5 mm, the spot diameter of the laser beam LB projected onto the molten pool 14a is, for example, about 0.4 to 1.2 mm. This laser beam LB is projected around a periphery having a diameter of 2 to 4 mm about four to 20 times at a scanning speed of about 20 mm to 50 mm/s.

In the present laser welding apparatus, the laser output is feedback-controlled based on the received light intensity of thermal radiation light (return light) TR emitted from the molten pool 14a. Thus, as shown in FIG. 6, the thermal radiation light TR emitted from the molten pool 14a is collected by the lens L1 via the laser head LH and then detected by the light receiving sensor 102. More specifically, in the laser head LH, the thermal radiation light TR is reflected by the mirror M1 via the lens L2, transmitted through the dichroic mirror DM, and then collected by the lens L1.

The higher the temperature of the molten pool 14a irradiated with the laser beam LB, the higher the received light intensity of the thermal radiation light TR detected by the light receiving sensor 102 becomes.

The laser control unit 103 performs feedback control of the laser oscillator 101 based on the received light intensity of the thermal radiation light TR detected by the light receiving sensor 102. Specifically, the laser control unit 103 outputs, to the laser oscillator 101, a control signal for controlling the laser output and the start and stop of the laser oscillation in the laser oscillator 101.

The laser control unit 103 includes a calculation unit such as a CPU (Central Processing Unit), a storage unit such as a RAM (Random Access Memory) that stores various control programs and data and a ROM (Read Only Memory), although they are not shown in the drawings.

Details of the method of controlling the laser welding by the laser control unit 103 will be described below.

<Method of Controlling Laser Welding>

Figure 7:
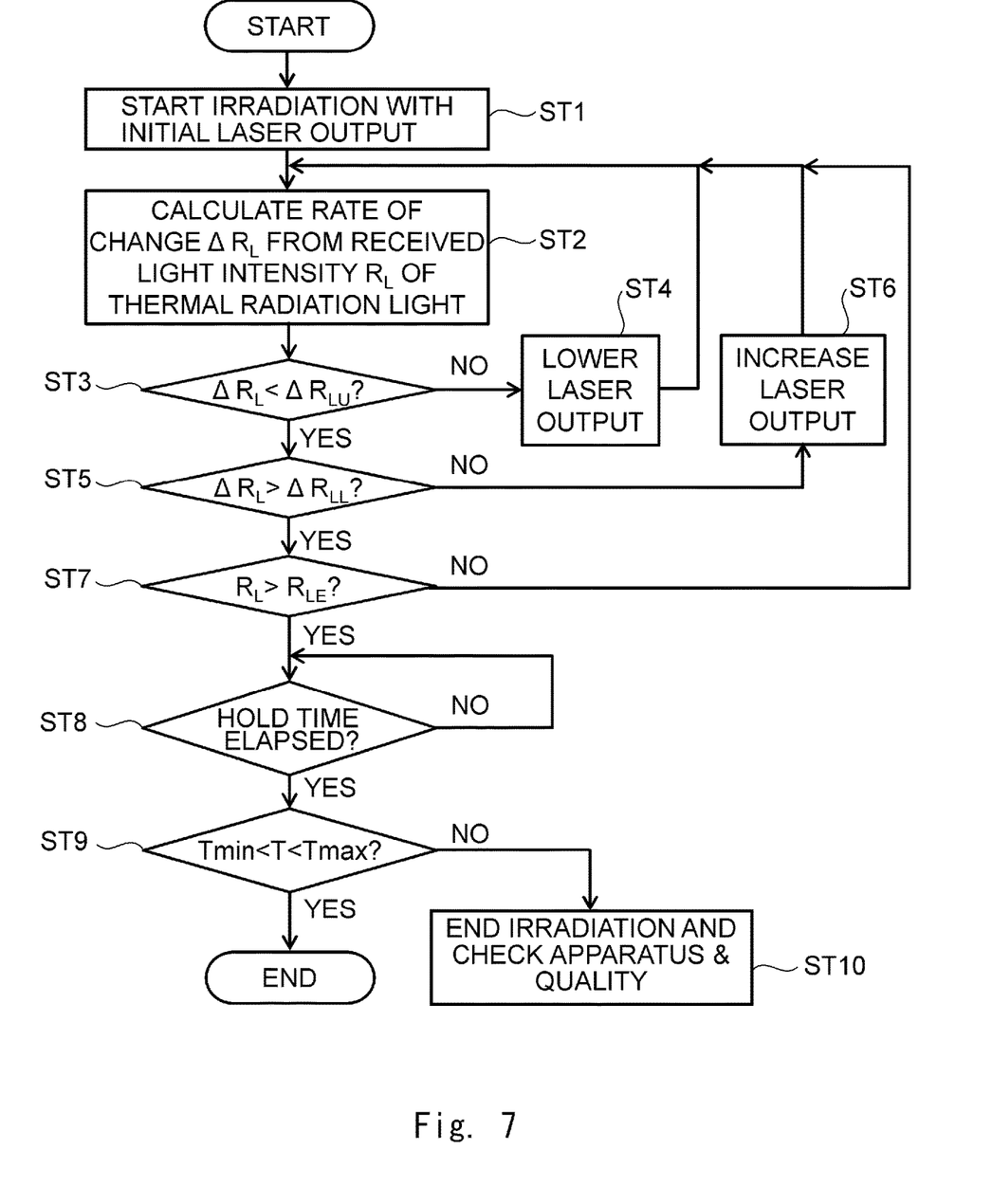
FIG. 7 is a flowchart showing a method of controlling laser welding used in the method of welding laminated metal foils according to the first embodiment.
Figure 8:
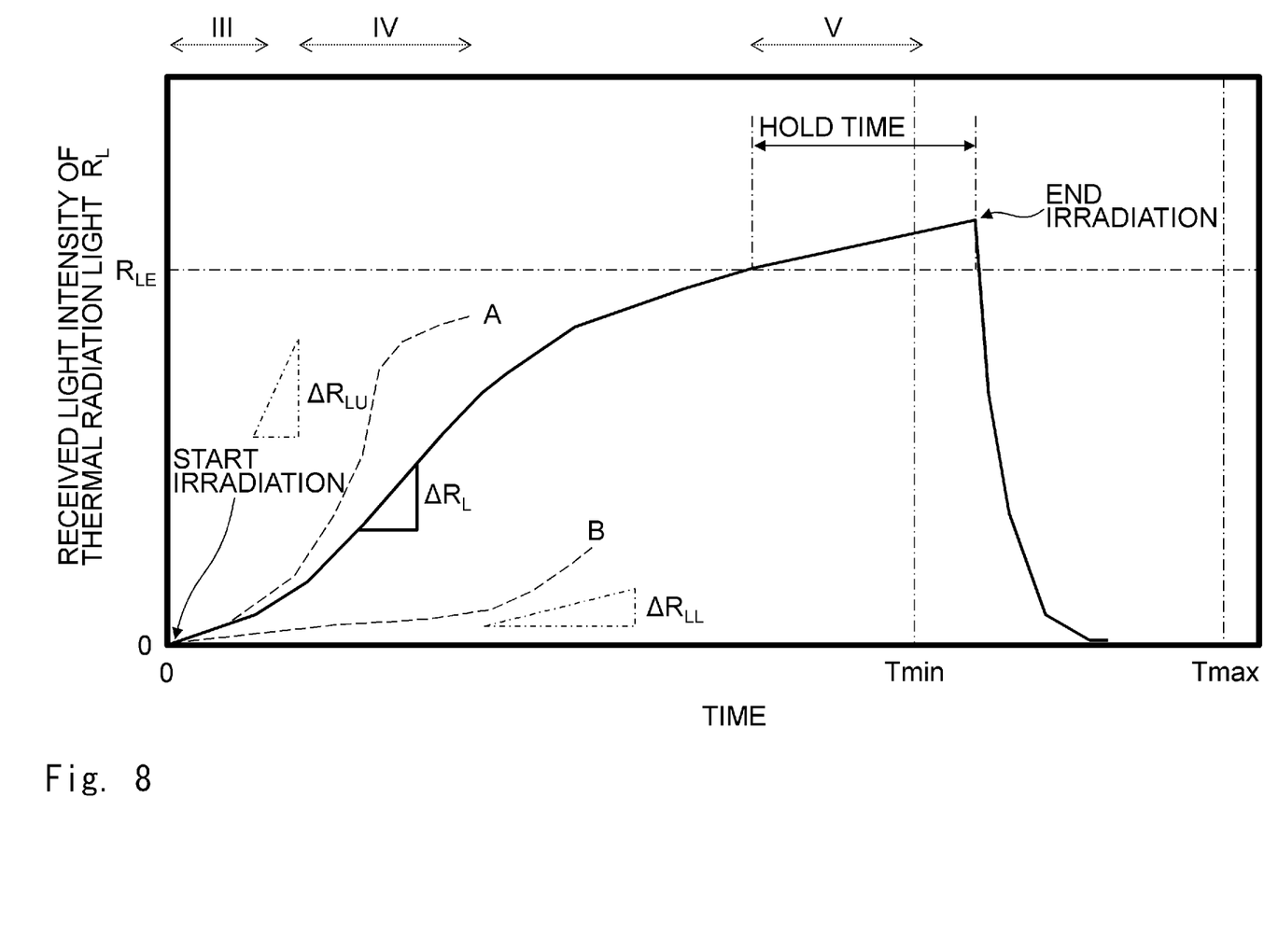
FIG. 8 is a graph showing a temporal change of received light intensity $R_L$ of thermal radiation light in one laser welding.

Hereinafter, a method of controlling the laser welding used in the method of welding laminated metal foils according to the first embodiment will be described with reference to FIGS. 7 and 8. FIG. 7 is a flowchart showing the method of controlling the laser welding used in the method of welding laminated metal foils according to the first embodiment. FIG. 8 is a graph showing the temporal change of the received light intensity $R_L$ of thermal radiation light in one laser welding. The solid curve line in FIG. 8 is a standard temporal change pattern of the received light intensity $R_L$ of the thermal radiation light.

The Roman numerals III, IV, and V shown in FIG. 8 mean FIGS. 3, 4, and 5, respectively. That is, the states of the molten pool 14a shown in FIGS. 3, 4 and 5 roughly correspond to the ranges of III, IV, and V shown in the graph of FIG. 8, respectively.

The configuration of the laser welding apparatus shown in FIG. 6 will also be appropriately referred to in the description of the flowchart shown in FIG. 7.

First, as shown in FIG. 7, the laser control unit 103 oscillates the laser oscillator 101 with a predetermined initial laser output, and starts irradiating the laminated metal foils 11, the upper metal plate 12, and the lower metal plate 13 with the laser beam LB (Step ST1). Then, as shown in the graph of FIG. 8, the received light intensity RL of the thermal radiation light TR detected by the light receiving sensor 102 starts to rise. This stage corresponds to FIG. 3.

Irradiation conditions other than the laser output are also set before the irradiation of the laser beam LB is started, as a matter of course. For example, the spot diameter and the irradiation time of the laser beam LB are set, and the scanning speed, the number of scans, etc. are set when the laser beam LB is scanned. The settings are stored in, for example, the storage unit of the laser control unit 103.

Next, as shown in FIG. 7, the laser control unit 103 calculates a rate of change $\Delta R_L$ from the received light intensity $R_L$ of the thermal radiation light TR detected by the light receiving sensor 102 (Step ST2). The rate of change $\Delta R_L$ indicates an amount of change in the received light intensity $R_L$ per predetermined time.

Next, the laser control unit 103 determines whether the rate of change $\Delta R_L$ is smaller than an upper limit value $\Delta R_{LU}$ of the predetermined change rate $\Delta R_L$ (Step ST3). The upper limit value $\Delta R_{LU}$ is stored in, for example, the storage unit of the laser control unit 103 before the irradiation of the laser beam LB is started.

When the rate of change $\Delta R_L$ is greater than or equal to the upper limit value $\Delta R_{LU}$ as indicated by the broken curve line A in the graph of FIG. 8 (Step ST3 NO), the laser control unit 103 lowers the laser output so that the rate of change $\Delta R_L$ becomes smaller than the upper limit value $\Delta R_{LU}$ (Step ST4). When the rate of change $\Delta R_L$ is greater than or equal to the upper limit value $\Delta R_{LU}$, the temperature of the molten pool 14a sharply rises, allowing spatter to easily occur and foils to easily break. The breaking of the foils refers to a phenomenon in which the metal foils break at the interface of the welded part 14 when the molten pool 14a is solidified and shrunk. The reduction value in the laser output is stored in, for example, the storage unit of the laser control unit 103 before the irradiation of the laser beam LB is started.

When the rate of change $\Delta R_L$ is smaller than the upper limit value $\Delta R_{LU}$ (Step ST3 YES), the laser control unit 103 does not change the laser output and determines whether the rate of change $\Delta R_L$ is greater than the lower limit value $\Delta R_{LL}$ of the predetermined rate of change $\Delta R_L$ (Step ST5). The lower limit value $\Delta R_{LL}$ is stored in, for example, the storage unit of the laser control unit 103 before the irradiation of the laser beam LB is started.

When the rate of change $\Delta R_L$ is equal to or less than the lower limit value $\Delta R_{LL}$ (Step ST5 NO) as indicated by the broken curve line B in the graph of FIG. 8, the laser control unit 103 increases the laser output so that the rate of change $\Delta R_L$ becomes greater than the lower limit value $\Delta R_{LL}$ (Step ST6). When the rate of change $\Delta R_L$ is equal to or less than the lower limit value $\Delta R_{LL}$, incomplete fusion tends to occur due to insufficient heat input. The increase value in the laser output is stored in, for example, the storage unit of the laser control unit 103 before the irradiation of the laser beam LB is started.

When the rate of change $\Delta R_L$ is greater than the lower limit value $\Delta R_{LL}$ (Step ST5 YES), the laser control unit 103 determines whether the received light intensity $R_L$ exceeds a target value $R_{LE}$ (Step ST7) without changing the laser output. The target value $R_{LE}$ is stored in, for example, the storage unit of the laser control unit 103 before the irradiation of the laser beam LB is started.

When the received light intensity $R_L$ is equal to or less than the target value $R_{LE}$ (Step ST7 NO), as the molten pool 14a is not sufficiently formed yet, the laser control unit 103 returns to Step ST2 without changing the laser output to calculate the rate of change $\Delta R_L$ again from the received light intensity $R_L$ of the thermal radiation light TR detected by the light receiving sensor 102. That is, until the received light intensity $R_L$ exceeds the target value $R_{LE}$ in the graph of FIG. 8, the laser control unit 103 repeats the Steps ST2 to ST7 and controls the laser output in such a way that the relation of the lower limit value $\Delta R_{LL}$<the rate of change $\Delta R_L$<the upper limit value $\Delta R_{LU}$ is satisfied. This stage corresponds to FIGS. 3 and 4.

When the received light intensity $R_L$ exceeds the target value $R_{LE}$ (Step ST7 YES), as the molten pool 14a has already been sufficiently formed, the laser control unit 103 does not change the laser output and determines whether a predetermined hold time has elapsed since the rate of change ΔR$_L$ exceeds the target value ΔR$_{LE}$, as shown in the graph of FIG. 8 (Step ST8). The hold time is stored in, for example, the storage unit of the laser control unit 103 before the irradiation of the laser beam LB is started.

When the hold time has not elapsed (Step ST8 NO), Step ST8 is repeated. That is, the laser control unit 103 continues to project the laser beam LB without changing the laser output until the hold time elapses in the graph of FIG. 8. This stage corresponds to FIG. 5.

When the hold time has elapsed (Step ST8 YES), the laser control unit 103 determines whether the relation of the lower limit value Tmin<irradiation time T<upper limit value Tmax shown in the graph of FIG. 8 is satisfied in regard to the irradiation time T of the laser beam LB (Step ST9). The lower limit value Tmin and the upper limit value Tmax are stored in, for example, the storage unit of the laser control unit 103 before the irradiation of the laser beam LB is started.

When the relation of the lower limit value Tmin<irradiation time T<upper limit value Tmax is not satisfied (Step ST9 NO), the laser control unit 103 ends the irradiation of the laser beam LB and determines that the laser welding apparatus and the quality of the welded part need to be checked (Step ST10). This is because when the irradiation time T is equal to or less than the lower limit Tmin, the irradiation time is too short, while when the irradiation time T is equal to or longer than the upper limit Tmax, the irradiation time is too long, and thus some kind of an abnormality may be occurring.

When the relation of the lower limit value Tmin<irradiation time T<upper limit value Tmax is satisfied (Step ST9 YES), the laser control unit 103 determines that the welding is successfully completed, and ends the irradiation of the laser beam LB.

As described above, the feedback control of the laser output using the received light intensity RL of the thermal radiation light TR detected by the light receiving sensor 102 can improve the quality of the welded part 14.

In the example shown in FIG. 7, the laser output is feedback-controlled as the irradiation condition of the laser beam LB, but other irradiation conditions such as the irradiation time may be feedback-controlled.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A method of welding laminated metal foils by projecting a laser beam onto laminated metal foils sandwiched between an upper metal plate and a lower metal plate from a side of the upper metal plate and laser-welding the laminated metal foils to the upper metal plate and the lower metal plate, the method comprising:
    forming a through-hole in an upper surface of the upper metal plate and forming a chamfered part so that a diameter of the through-hole expands toward the upper surface before the laser welding; and
    in the laser welding,
        projecting the laser beam for heat conduction welding onto the chamfered part of the upper metal plate and orbiting the laser beam in a circle along the chamfered part to form a molten pool; and
        continuing orbiting the laser beam in the circle along the same singular trajectory to agitate the molten pool and grow the molten pool in a laminating direction of the laminated metal foils so that the molten pool reaches the lower metal plate.

2. The method according to claim 1, wherein in the laser welding, feedback control is performed on an irradiation condition of the laser beam based on intensity of thermal radiation light emitted from the molten pool.

3. The method according to claim 1, wherein the laminated metal foils, the upper metal plate, and the lower metal plate are made of an aluminum-based or a copper-based metal material.

* * * * *